United States Patent [19]
Wahl et al.

[11] Patent Number: 5,581,029
[45] Date of Patent: Dec. 3, 1996

[54] MEASUREMENT SYSTEM FOR A PRESSURE GAGE AS WELL AS A PROCESS FOR THE FABRICATION OF SUCH A MEASUREMENT SYSTEM

[75] Inventors: Detlef Wahl, Erlenbach; Burkhard Meisenzahl, Burgstadt; Jurgen Berninger, Klingenberg; Klaus Schafer, Bad Konig; Helmut Berninger, Obernburg, all of Germany

[73] Assignee: Wika Alexander Wiegand GmbH & Co., Klingenberg, Germany

[21] Appl. No.: 505,102

[22] Filed: Jul. 21, 1995

[30] Foreign Application Priority Data

Jul. 27, 1994 [EP] European Pat. Off. ............... 94111703

[51] Int. Cl.$^6$ ....................................................... G01L 7/04
[52] U.S. Cl. ............................................................ 73/741
[58] Field of Search .............................. 73/737, 738, 739, 73/741, 742, 743

[56] References Cited

U.S. PATENT DOCUMENTS

| | | | |
|---|---|---|---|
| 3,201,992 | 8/1965 | Hoff, Jr. ........................... | 73/738 |
| 3,527,102 | 9/1970 | Harland ............................. | 73/738 |
| 4,337,664 | 7/1982 | Kipp et al. ........................ | 73/741 |

*Primary Examiner*—Richard Chilcot
*Assistant Examiner*—William L. Oen
*Attorney, Agent, or Firm*—Roth & Goldman

[57] ABSTRACT

In a measurement system for a pressure gage which has a bourdon tube spring as well as a spring support, the bourdon tube spring is made of a metallic material and the spring support is made of a polymer plastic. The connection between the bourdon tube spring and the spring support is made by means of a metallic transition element which has a recess into which the fixed end of the bourdon tube spring is glued or soldered, and which has engagement means formed on it which are in form-fitting engagement with the spring support. The compound assembly comprising the transition element and the spring support combines the cost advantage of the fabrication of the spring support from plastic with the mechanical advantages and antileak advantages of a metal-to-metal connection for the connection of the bourdon tube spring to the spring support. The fabrication of the measurement system is carried out such that the compound assembly of the spring support and the transition element is produced first, before the connection with the bourdon tube spring is made in conventional manner.

20 Claims, 2 Drawing Sheets

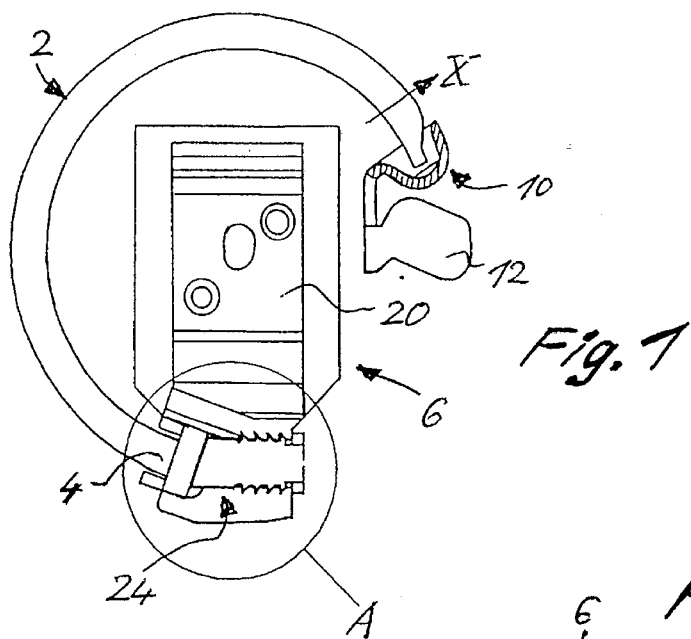
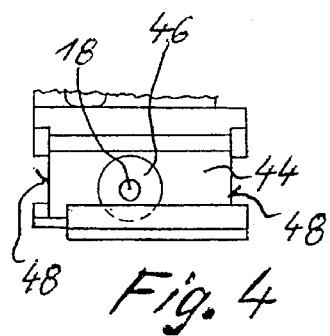
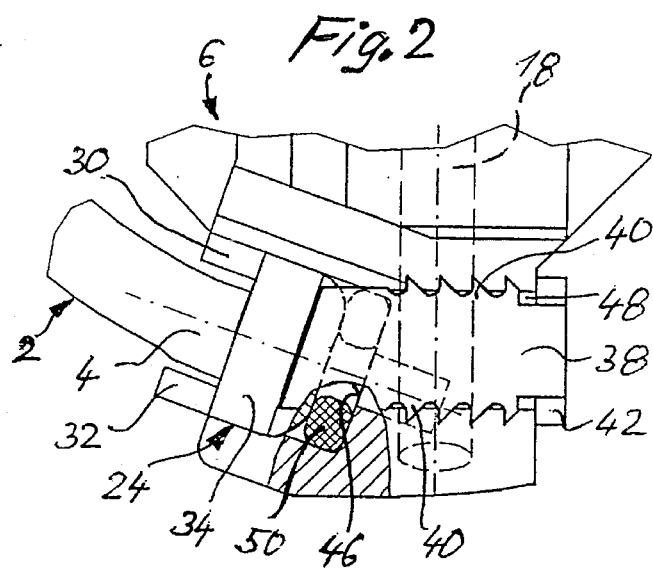
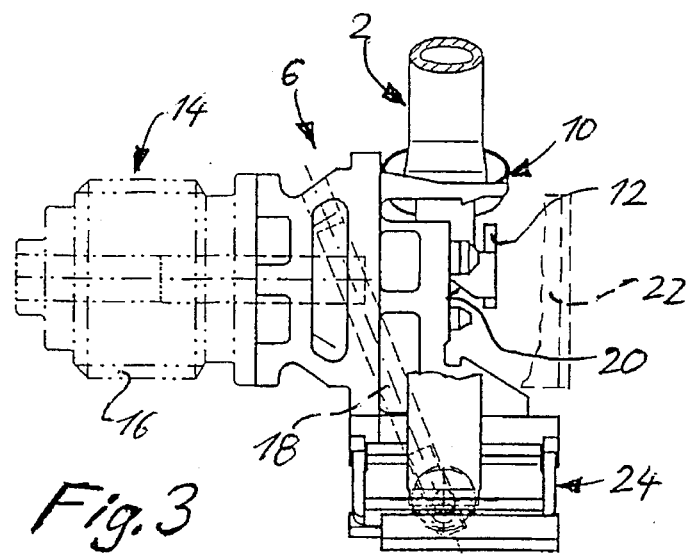

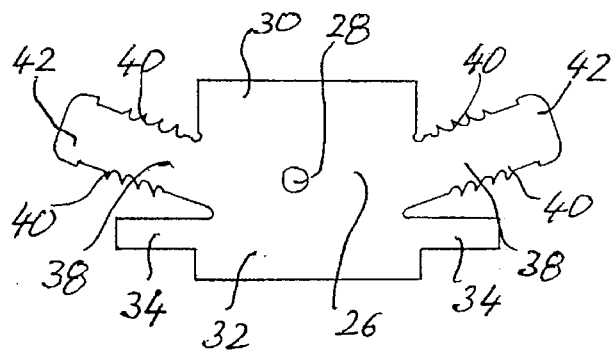
Fig. 6
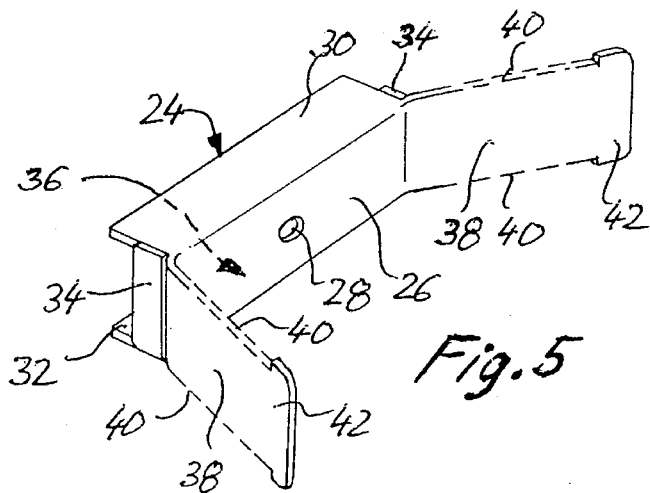
Fig. 5
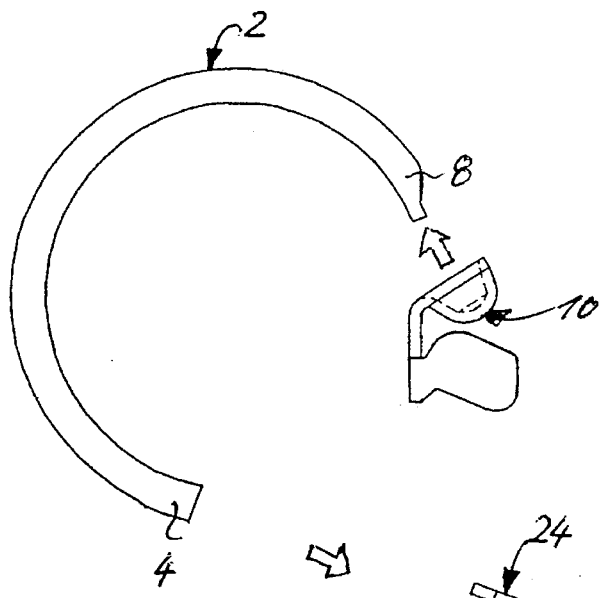
Fig. 7
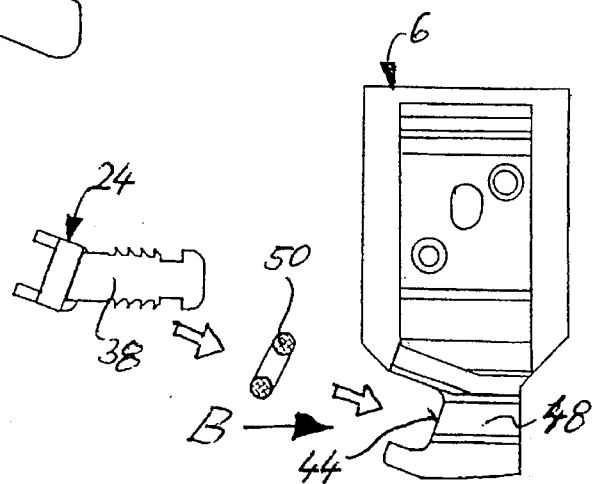

MEASUREMENT SYSTEM FOR A PRESSURE GAGE AS WELL AS A PROCESS FOR THE FABRICATION OF SUCH A MEASUREMENT SYSTEM

DESCRIPTION

A measurement system for a pressure gage which has a bourdon tube spring internally subjected to the pressure to be measured as well as a spring support onto which the bourdon tube spring is attached with a first end is known. Inside the spring support a connecting channel is formed, which is connected on the one hand with the interior of the bourdon tube spring and is connected on the other during operation with a system which carries a pressure medium whose pressure is to be measured. Along with a pointer index, a pointer, a calibrated dial, and a housing which has a viewing glass, such a measurement system customarily forms a pressure gage. Depending on the pressure of the pressure medium, the free, second end of the bourdon tube spring is more or less extensively deflected. This deflection is transmitted via a connecting rod to the pointer index and converted by the pointer index into a rotational positioning of the pointer, such that a comparison of the pointer position with the scale of the calibrated dial enables reading out the pressure value associated with the pressure measured.

The bourdon tube spring of such a measurement system is made of a metallic material, for example, of alloyed or unalloyed steel, of copper alloys or wrought copper alloys or of monel metal. For a long time it was customary to also produce the spring support from a metallic material and to solder the one first end of the bourdon tube spring to the spring support to produce the measurement system from the bourdon tube spring and the spring support. To fabricate the spring support from a metallic material, machining, which is relatively time-consuming and costly, is necessary. To reduce these material and fabrication costs, it is already known to make the spring support from a polymer plastic. With this procedure, the possibility of soldering the first end of the metallic bourdon tube spring directly to the spring support is ruled out.

From publications DE-17 99 009-U, DE-80 02 155-U, DE-20 49 633-A, and U.S. Pat. No. 4,337,664 A it is known to glue the first end of the bourdon tube spring using an adhesive substance to a spring support made of plastic. For this purpose, an opening adapted to the shape of the first end of the bourdon tube spring is formed in the spring support, into which opening the first end is inserted with the application of a suitable adhesive substance. In particular because of the differing thermal expansion caused by the different materials of the bourdon tube spring and the spring support, leaks may develop during the course of relatively long periods of operation and thus result in failures of the measurement system. Although this is prevented by an appropriately thick, elastic adhesive layer, the geometrically precisely defined attachment of the first end of the bourdon tube spring to the spring support is no longer guaranteed.

It is further known from publications DE-17 99 009-U, DE-20 49 633-A, DE-24 08 369-A, DE-21 40 086-B1, DD-91 142-B, DD-99 225-B, and DD-101 487-B to injection mold around the first end of the bourdon tube spring during injection molding of the spring support. However, similar problems arise with regard to the leakiness as in the case of gluing, as well as additional problems because of the deformation of the first end of the bourdon tube spring occurring under the pressure of injection if no additional measures are taken. Such additional measures are known from publications DE-21 40 086-B1, DD-91 142-B, DD-99 225-B, and DD-101 487-B and consist essentially of a specific geometric design of the first end of the bourdon tube spring and/or additional inserts and extensions on the first end of the bourdon tube spring. However, the deflection behavior of the bourdon tube spring is altered by these measures. Moreover, the cost advantage which results from the fabrication of the spring support from a polymer plastic is at least partially lost.

A measurement system with the characteristics of the generic part of claim 1 as well as a process for fabrication of such a measurement system with the characteristics of the generic part of claim 16 is known from publication DE-17 99 009-U, in particular FIG. 2a.

This known measurement system has a metallic transition element with which the first end of the bourdon tube spring is fixedly connected. The transition element is annular and has a radial opening which opens into the interior of the bourdon tube spring which is soldered onto the transition element. This transition element is attached to the spring support by means of a bolt with interposition of gaskets, whereby a channel is formed in the bolt, which produces a connection between the opening of the transition element and the connecting channel in the spring support. According to the known process, the first end of the bourdon tube spring is first soldered with the transition element, before this is attached to the spring support by means of the bolt. With this known measurement system, the above-described leaks which may occur with gluing or with simple injection molding in are prevented. However, the fabrication expense is significant because of the components needed and the comparatively complex assembly.

The object of the invention is to improve the generic measurement system such that it can be produced with low fabrication outlays while maintaining high reliability in service, in particular absence of leaks even in long-term operation such that the cost advantage of the plastic spring support can be exploited to a large extent. The generic process is also improved in the same sense.

This object is accomplished with regard to the measurement system by the measurement system according to claim 1. Here, provision is made according to the invention that engagement means are formed in one piece with the transition element, which means are in form-fitting engagement with the spring support, and that the transition element has a recess on its side facing the first end of the bourdon tube spring into which the first end is inserted.

In the spring support according to the invention the metallic transition element and the spring support made of the polymer plastic form a compound assembly which consists predominantly of plastic and can thus be cost-effectively fabricated, for example, by injection molding. Only that region of this compound assembly which is connected with the first end of the metallic bourdon tube spring is made of metal such that there a mechanically solid and permanently pressure-tight metal-to-metal connection exists between the first end of the bourdon tube spring on the one hand and the transition element on the other. This metal-to-metal connection can be produced in known manner both by soldering and by gluing. Even when it has been produced by gluing, this connection is more durable and more reliable-since it is a glued connection between two metal parts—than the prior art glued connections between a metal bourdon tube spring and a spring support made of plastic. Engagement means, which are in form-fitting engagement with the spring support, are formed in one piece with the transition element. As a result of the fact that the engagement means are formed in one piece with the transition element, costly assembly work is avoided. The form-fitting engagement of these engagement means with the spring support provides for a durable solid mechanical connection between the transition element and the spring support and can be produced simply.

Although it is possible in principle that during the fabrication of the measurement system according to the invention the transition element is first connected with the first end of the bourdon tube spring and only after that is the transition element attached to the spring support, it is preferable to proceed in the manner defined in claim 16 whose object accomplishes the part of the object of the invention oriented toward the process. According to the invention, provision is thus made according to the generic part of claim 16 that first the transition element, on which engagement means are formed in one piece, is brought into form-fitting engagement with the spring support and thus solidly connected therewith and that after that the first end of the bourdon tube spring is solidly connected with the transition element.

When the procedure according to claim 16 is followed according to the invention, the bourdon tube springs and the compound assembly of the transition element and the spring support, which replaces the conventional metallic spring support, are connected to each other in the same manner and using the same devices as are used in conventional measurement systems of a metallic bourdon tube spring and a metallic spring support. Modifications of the bourdon tube spring for the purpose of making it suitable for a connection with a spring support made of plastic are not necessary. Moreover, the same automated soldering and gluing devices as were developed for measurement systems with a metallic spring support are also used in the fabrication of the measurement system according to the invention. The cost savings permitted by the use of a polymer plastic as the material for the spring support are thus not greatly offset by added costs for modifications of the fabrication devices and of the bourdon tube spring.

In an advantageous embodiment of the measurement system according to the invention, provision may be made that the recess provided for the end of the bourdon tube spring in the transition element has the shape of a groove open on the sides (claim 2) or the shape of a right parallelepiped, i.e., a groove closed on the sides (claim 3).

The transition element is preferably either punched from a sheet and bent (claim 13) or fabricated by machining as a milled part (claim 14).

In an advantageous embodiment of the measurement system according to the invention, provision may further be made that the transition element have a bottom section forming the bottom of the recess from which at least one projection protrudes from the back turned away from the recess, which projection forms the engagement means. This at least one projection may be injection molded during the injection molding of the spring support (claim 7).

Alternatively, provision may be made that two projections be provided in the form of tongues respectively formed on opposite edges of the bottom section, which tongues lie against the spring support engaging form-fittingly with it (claim 8). These tongues are pressed against the spring support such that in the process they engage behind the spring support with their free end sections and/or engage in the spring support with teeth formed on the tongues. Preferably, a gasket is disposed between the back of the bottom section and the spring support, which gasket seals the transitional area from the connecting channel to the opening in the transition element toward the outside.

Additional advantageous embodiments of the invention are characterized in the subclaims and are obvious from the following description of one exemplary embodiment referring to the drawings. They depict:

FIG. 1 a front view of one embodiment of the measurement system according to the invention;

FIG. 2 an enlarged detail A according to FIG. 1;

FIG. 3 a side view of the measurement system according to FIG. 1;

FIG. 4 a cutaway view from direction B in FIG. 7;

FIG. 5 a perspective view of a transition element of the measurement system;

FIG. 6 a punched blank for the transition element according to FIG. 5; and

FIG. 7 individual steps during the fabrication of the measurement system.

FIG. 1 depicts a measurement system in a front view. This comprises a bourdon tube spring 2, which is solidly connected on its first end 4 with a spring support 6 supporting it. The hollow bourdon tube spring 2 is made of a metallic material, for example, of a high-alloy steel, copper alloys or wrought copper alloys or of monel metal. On its movable second end 8, an end piece 10, on which a small plate 12 is formed, is soldered onto the bourdon tube spring 2.

The spring support 6 is produced from a polymer plastic in one piece, for example, by injection molding. As depicted in FIG. 2 with double dot-dash lines, a connecting piece 14 is formed on the spring support 6, on the back of the spring support 6, i.e., on the left in FIG. 3. This connecting piece is provided with a male thread 16 by means of which the connecting piece 14 can be screwed onto to a system not shown which carries the pressure medium whose pressure is to be measured. Because of the disposition of the connecting piece 14 on the back of the spring support, the exemplary embodiment depicted is a so-called back measurement system. However, the invention is not restricted to such a back measurement system. Rather, it is also possible to dispose the connecting piece 14 on the bottom (FIGS. 1 and 3) of the spring support 6 such that a so-called radial measurement system would be produced.

In the connecting piece 14 and in the spring support 6, a connecting channel 18 consisting of a plurality of sections is formed, which channel is in fluid connection on the one hand with the interior of the bourdon tube spring 2 and on the other with the system carrying the pressure medium, such that the pressure to be measured arrives through the connecting channel 18 into the interior of the bourdon tube spring 2 and this is internally subjected to the pressure to be measured.

The above-described measurement system is intended for a pressure gage whose remaining parts and system may be of conventional design. Following fabrication of the pressure gage, a pointer index is attached to the front 20 of the spring support, of which index only a bottom plate 22 is depicted in cross-section and dotted lines in FIG. 3. Between the pointer index and the measurement system it is arranged by a connecting rod (not shown) whose one end is hinged with the small plate 12 of the end piece 10, for which the small plate is provided with a hole. The pointer index has a pointer (not shown). The measurement system and the pointer index are disposed inside a housing (not shown) with a viewing glass. A calibrated dial (not shown) is disposed between the pointer index and the pointer. Depending on the pressure prevailing in the bourdon tube spring 2, its second, movable end 8 is deflected more or less extensively in the direction of an arrow X. This deflection is transmitted by the end piece 10 and the connecting rod to the pointer index and converted by this into a rotational positioning of the pointer which is associated with a specific pressure value on the calibrated dial.

It is clear from the above explanation that the spring support 6 must hold the bourdon tube spring 2 such that with a specific reference pressure the second end 8 and thus the end piece 10 always assume a precisely defined position relative to the pointer index and thus relative to the spring support bearing the pointer index, so that the kinematic relationships between the movable second end 8 of the bourdon tube spring 2 and the pointer index are as nearly the same as possible from measurement system to measurement system in series production.

The mechanically solid and simultaneously pressure-tight connection between the bourdon tube spring 2 and the spring support is implemented in the exemplary embodiment by a transition element 24, which is made of a metallic material which is compatible with the material of the bourdon tube spring 2. One exemplary embodiment of the transition element 24 is depicted perspectively in FIG. 5. This exemplary embodiment of the transition element 24 was fabricated by punching from a sheet and bending. Its punched blank is depicted in FIG. 6, whereby the sections of the transition element in the punched blank according to FIG. 6 explained in the following are identified with the same reference numbers.

The transition element 24 has a rectangular bottom section 26 in the center of which an opening 28 is formed. Two rectangular wall sections 30 and 32 are formed on the two long sides of the rectangular bottom section 26, which wall sections are bent toward the front of the bottom section 26 such that the two wall sections 30 and 32 have a U-shaped profile along with the bottom section 26. A transverse wall section 34 is formed respectively on each of the two short sides of the wall section 32. The two transverse wall sections 34 are bent, as depicted in FIG. 5, such that the bottom section 26 and the two wall sections 30 and 32 as well as the two transverse wall sections 34 together form a recess 36 in the shape of a parallelepiped on the front of the transition element 24, of which the bottom of the recess is formed by the bottom section 26.

A tongue 38 is formed on each of the two short sides of the rectangular bottom section 26. The two tongues are bent back such that they form projections protruding back from the back of the transition element 24. In the finished measurement system (see FIGS. 1, 2, and 3) the two tongues 38 enclose an angle of approximately 90° with the bottom section 26. In FIG. 5 this angle is larger, i.e., FIG. 5 depicts the two tongues 38 in the not yet fully bent state, which is not implemented until the transition element 24 is connected to the spring support 6. Each tongue 38 has teeth 40 along its two long edges, which teeth are depicted in FIG. 6, but are only indicated in FIG. 5 by dashed depiction of the two long edges. The end sections 42 of each tongue 38 are formed without teeth. The two tongues 38 of the transition element 24 form engagement means which are form-fittingly engaged with the spring support 6 in the finished measurement system.

The spring support 6 has on its bottom end in the figures a supporting surface 44 running from its front to its back (see also FIG. 4), whose dimensions are adapted to those of the bottom section 26 of the transition element 24 such that this bottom section 26 can lie against the supporting surface 44. The connecting channel 18 opens in the supporting surface 44, whereby this opening is surrounded by a turned annular shoulder 46. From the short lateral sides of the supporting surface 44 as well as on both the front and the back of the spring support 6, respectively, a groove 48 runs toward the back, i.e., to the right in FIG. 7. The dimensions of the two grooves 48 are adapted to those of the tongues 38 of the transition element 24.

In the following the assembly of the above-described measurement system is explained with reference to FIG. 7.

First, the elements of the measurement system depicted in FIG. 7, i.e., the bourdon tube spring 2, the end piece 10, the transition element 24, and the spring support 6, are produced individually. A gasket in the form of an O-ring 50 made of an elastomer material is placed on the annular shoulder. Then, the transition element 24 is installed on the spring support 6. In this process, the transition element initially still has the form according to FIG. 5, whereby the tongues 38 enclose an angle greater than 90° with the bottom section 26. In this form the transition element 24 is placed with the back of its bottom section 26 on the supporting surface 44 and pressed against this such that the O-ring is enclosed between the back of the bottom section 26 and the annular shoulder 46. The opening of the connecting channel 18 and the location of the opening 28 in the bottom section 26 are coordinated with each other such that the opening 28 is connected with the connecting channel 18 in the assembled state of the transition element 24, whereby this transitional region from the connecting channel 18 to the opening 28 is sealed toward the outside by the O-ring 50.

While the transition element 24 is pressed against the supporting surface 44, the two tongues 38 are bent far enough inward that they lie in the grooves 48 of the spring support 6. In this process they are simultaneously pressed with such force against the spring support 6 that the teeth 40 cut into the lateral walls of the grooves 48, as can be seen specifically in FIG. 2. Thus, a form-fitting engagement between the transition element 24 and the spring support 6 has been produced. In addition, the end sections 42 of the two tongues 38 are bent such that they attack the spring support 6 on its side turned away from the supporting surface 44 and thus engage the back of the spring support.

The above-described steps during the connection of the transition element 24 with the spring support 6 can be easily automated and performed by machine. The result of these steps is a compound assembly of the spring support 6, the O-ring 50, and the transition element 24. On this assembly the recess 36 of the transition element 24 forms a recess into which the first end 4 of the bourdon tube spring 2 can be inserted. In the region of this recess the assembly is made of a metallic material, i.e., the material of the transition element 24, such that the connection of the bourdon tube spring 2 to the spring support 6 can be produced by a metal-to-metal connection with the resultant advantages. With the exception of this region, the assembly is made of the polymer plastic of the spring support 6 such that this affords the corresponding cost advantages in the production of the spring support 6. The assembly of the spring support 6 and the transition element 24 may, if need be, be fabricated with the geometry, in particular the dimensions and the position, of the recess 36, as is customary with metallic spring supports. Also, this results in the further advantage that the recess 36 to accommodate the first end 4 of the bourdon tube spring 2 may also be closed on the sides simply, i.e., by means of the transverse wall sections 34. This facilitates subsequent soldering in comparison with the case that the recess is a slot open on the sides, as is customary with metallic spring supports.

After the compound assembly made of the transition element 24, the O-ring 50, and the spring support 6 has been produced in the above-described manner and the bourdon tube spring 2 has been provided with the end piece 10, the first end 4 of the bourdon tube spring 2 is inserted into the recess 36. This occurs preferably in a device (not shown) with suitable workpiece receptacles for the spring support 6 and the end piece 10 such that in this device the bourdon tube spring 2 with the end piece 10 on the one hand and the spring support 6 on the other are kept precisely oriented to each other in the desired relative position. In this predefined relative position the connection is then made between the first end 4 and the transition element 24 in a known manner, for example, by soldering or even by gluing.

The invention is not restricted to the above-described exemplary embodiment of the measurement system as well as the above-described exemplary embodiment of the process for fabrication of the measurement system. Other embodiments of the invention are possible and result from the claims as well as from the descriptive introduction. For example, the O-ring 50 used may be replaced by an elastomer molded in place. Moreover, in the exemplary embodiment described, the transition element 24 is a separate component. Alternatively, the transition element 24 may be produced in one piece along with other components, for example, in one piece with the bottom plate 22 of the pointer index depicted only in dotted lines in FIG. 3.

In the exemplary embodiment described, the spring support 6 is a separate component. However, it can also be formed in one piece with other components, for example, the housing of the pressure gage.

In a measurement system for a pressure gage which has a bourdon tube spring as well as a spring support, the bourdon tube spring is made of a metallic material and the spring support from a polymer plastic. The connection between the bourdon tube spring and the spring support is produced by means of a metallic transition element which has a recess into which the fixed end of the bourdon tube spring is glued or soldered, and which has engagement means formed on it which are in form-fitting engagement with the spring support. The compound assembly comprising the transition element and the spring support combines the cost advantage of the fabrication of the spring support from plastic with the mechanical advantages and antileak advantages of a metal-to-metal connection for the connection of the bourdon tube spring to the spring support. The fabrication of the measurement system is carried out such that the compound assembly comprising the spring support and the transition element is produced first, before the connection with the bourdon tube spring is made in conventional manner.

We claim:

1. A measurement system for a pressure gage with a bourdon tube spring (2) made of a metallic material internally subjected to the pressure to be measured and with a spring support (6) made of a polymer plastic, whereby the bourdon tube spring is solidly attached at its first end (4) with a metallic transition element (24) which is, for its part, attached on the spring support (6), and whereby the transition element (24) has an opening (28) through which the interior of the bourdon tube spring 2 is in fluid connection with a connecting channel (18) formed in the spring support (6), characterized in that engagement means (38) which are in form-fitting engagement with the spring support (6) are formed in one piece with the transition element (24) and that the transition element (24) has on its side facing the first end (4) of the bourdon tube spring (2) a recess (36) into which the first end (4) is inserted.

2. The measurement system according to claim 1, characterized in that the recess has the form of a groove open on the sides.

3. The measurement system according to claim 1, characterized in that the recess (36) has the form of a parallelepiped.

4. The measurement system according to one of claims 1 through 3, characterized in that the first end (4) of the bourdon tube spring (2) is soldered to the transition element (24).

5. The measurement system according to one of claims 1 through 3, characterized in that the first end (4) of the bourdon tube spring (2) is glued to the transition element (24).

6. The measurement system according to one of claims 1 through 5, characterized in that the transition element (24) has a bottom section (26) forming the bottom of the recess (36) from which bottom section at least one projection (38) protrudes from the back turned away from the recess, which projection forms the engagement means.

7. The measurement system according to claim 6, characterized in that the projection was molded during the injection molding of the spring support (6).

8. The measurement system according to claim 6, characterized in that two projections are provided in the form of tongues (38) formed respectively on opposite edges of the bottom section (26), which tongues rest form-fittingly against the spring support (6) engaging with it.

9. The measurement system according to claim 8, characterized in that each of the two tongues (38) has a bent end section (42) which rests against the side of the spring support (6) turned away from the bottom section (26).

10. The measurement system according to claim 8 or 9, characterized in that the tongues (38) in each case lie in a groove (48) of the spring support (6) and have teeth (40) on at least one of their long edges, which teeth are pressed into the associated wall of the groove.

11. The measurement system according to one of claims 8 through 10, characterized in that between the back of the bottom section (26) and the spring support (6) a gasket (50) is disposed, which seals the transition region from the connecting channel (18) to the opening (28) in the transition element (24) toward the outside.

12. The measurement system according to claim 11, characterized in that the gasket is formed on the spring support (6).

13. The measurement system according to claim 11, characterized in that an annular shoulder (46) is formed on the spring support (6), on which shoulder an O-ring sits as a gasket.

14. The measurement system according to one of claims 1 through 13, characterized in that the transition element (24) was punched from a sheet and bent.

15. The measurement system according to one of claims 1 through 13, characterized in that the transition element is a milled part.

16. A process for fabrication of a measurement system for a pressure gage, whereby a bourdon tube spring (2) made of a metallic material internally subjected to the pressure to be measured, a spring support (6) made of a polymer plastic, and a metallic transition element (24) disposed between a first end (4) of the bourdon tube spring (2) and the spring support (6) are solidly connected to each other, characterized in that first the transition element (24), on which engagement means (38) are formed in one piece, is brought into form-fitting engagement with the spring support (6) and is solidly connected therewith and that after that the first end (4) of the bourdon tube spring (2) is solidly connected with the transition element (24).

17. The process according to claim 16, characterized in that the solid connection between the first end (4) of the bourdon tube spring (2) and the transition element (24) is produced by soldering.

18. The process according to claim 16, characterized in that the solid connection between the first end (4) of the bourdon tube spring (2) and the transition element (24) is produced by gluing.

19. The process according to one of claims 16 through 18, characterized in that the engagement means of the transition element (24) are molded during the injection molding of the spring support (6).

20. The process according to one of claims 16 through 18, whereby the transition element (24) has a bottom section (26) and tongues (38) formed on its sides, characterized in that the transition element (24) is solidly connected with the spring support (6), in that the tongues (38) are pressed onto the spring support (6) and engage the back of the spring support (6) with their free end sections (42) and/or engage in the spring support (6) with teeth (40) formed on the tongues (38).

\* \* \* \* \*